(12) United States Patent
Eberling et al.

(10) Patent No.: US 9,381,899 B2
(45) Date of Patent: Jul. 5, 2016

(54) APPARATUS AND METHOD FOR ISOLATING AN INTACT PORTION OF A SERVICE BRAKING CIRCUIT FROM A FAILED SERVICE BRAKE WHEEL END

(71) Applicant: Bendix Commercial Vehicle Systems, LLC, Elyria, OH (US)

(72) Inventors: Charles E. Eberling, Wellington, OH (US); Fred W. Hoffman, Wakeman, OH (US); Ronald S. Plantan, Mooresville, NC (US)

(73) Assignee: Bendix Commercial Vehicle Systems, LLC, Elyria, OH (US)

( * ) Notice: Subject to any disclaimer, the term of this patent is extended or adjusted under 35 U.S.C. 154(b) by 732 days.

(21) Appl. No.: 13/654,946

(22) Filed: Oct. 18, 2012

(65) Prior Publication Data
US 2014/0110999 A1    Apr. 24, 2014

(51) Int. Cl.
*B60T 8/88* (2006.01)
*B60T 17/22* (2006.01)

(52) U.S. Cl.
CPC ............... *B60T 8/885* (2013.01); *B60T 17/22* (2013.01); *B60T 2270/402* (2013.01)

(58) Field of Classification Search
CPC ............. B60T 8/88; B60T 8/885; B60T 8/94; B60T 8/96; B60T 2270/403; B60T 17/226; B60T 17/227; B60T 17/228
USPC ................. 303/122, 122.09, 122.15, 191
See application file for complete search history.

(56) References Cited

U.S. PATENT DOCUMENTS

| 4,591,213 A | 5/1986 | Rapoport |
| 5,044,697 A | 9/1991 | Longyear et al. |
| 2009/0280959 A1 | 11/2009 | Bensch et al. |

*Primary Examiner* — Robert A Siconolfi
*Assistant Examiner* — Vu Q Nguyen
(74) *Attorney, Agent, or Firm* — Crowell & Moring LLP

(57) ABSTRACT

An apparatus and method for protecting an intact portion of a service brake system from a failed wheel end of a vehicle is provided. A failure in a wheel end is detected by determining an operation state of each of the wheel ends by monitoring parameters including the pressure in a parking brake air supply line. When it is determined that a failed wheel end is present in the service brake system, an antilock braking modulator or a service brake isolation valve is switched to a state in which the failed wheel end is isolated from the rest of the brake system. The service brake of the failed wheel end is disabled, while the service brakes of the other wheel ends are enabled for normal operation including antilock braking. And the parking brake of the failed wheel end is enabled, while the parking brakes of the other wheel ends are disabled to prevent immobilization of the vehicle.

11 Claims, 2 Drawing Sheets

APPARATUS AND METHOD FOR ISOLATING AN INTACT PORTION OF A SERVICE BRAKING CIRCUIT FROM A FAILED SERVICE BRAKE WHEEL END

BACKGROUND AND SUMMARY OF THE INVENTION

The present invention relates to vehicle braking systems and, in particular, to an apparatus and method for isolating an intact portion of a service braking circuit from a failed service brake wheel end. Additionally, the present invention isolates a failed parking brake from an intact portion of a parking brake circuit. By isolating the failed service brakes and parking brakes of a vehicle from the rest of the braking system, complete immobilization of the vehicle can be prevented while maintaining use of the antilock braking system (ABS) in the event of a wheel end failure.

The present invention protects the intact wheel ends of a service braking circuit from a failure of a portion of the failed circuit. The operation state of the parking brake of each wheel end may be determined by monitoring air line pressure, force applied to the wheel end, wheel speed, temperature at the wheel end, and/or other like parameters. When a failed wheel end is detected, the remaining intact wheel ends' service brake control is protected and isolated from the failed wheel end.

Moreover, it is desirable to maintain use of the ABS in the event of a service brake failure. With rear axle wheel end failures, for example, braking systems often revert to spring brake modulation, but this eliminates antilock braking on all wheel ends of the affected braking circuit. The present invention, however, allows for ABS control on the intact wheel ends of a braking circuit with a failed wheel end. Further, the present invention allows for more system pressure to be retained with the failed wheel end by isolating the failed pneumatic wheel end from the intact portion of the pneumatic braking system.

In accordance with an exemplary embodiment of the present invention, an antilock braking system control unit is used to control individual service-braked wheel ends by using ABS modulators as isolation devices. Many different parameters can be used to sense individual parking brake status, such as air line pressure, wheel speed, stroke, torque, wheel slip, temperature and the like. In particular, it is desirable to use park line pressure to isolate the pressure to the service side of the failed wheel end.

As an alternative to the above-described electronic control embodiment, a pneumatic control or an electro-pneumatic control can be used to control the braking system. In particular, pneumatic isolation valves can be used to isolate the service brake side of the system.

With regard to parking brakes, commercial vehicles are typically equipped with spring-actuated/fluid released parking brake systems, in particular pneumatic systems which utilize compressed air to release the parking brake actuator of each wheel end's spring brake actuator. The parking brakes in such vehicles remain released as long as the parking brake release pressure is maintained in spring brake actuators. Such systems typically have a common source of pressure connected to each wheel end's spring brake actuator, such that application of pressure to the common lines simultaneously releases the vehicle's parking brakes.

A single point of failure in such systems may result in application of all of the wheel end spring applied parking brake portions of the parking brake actuators, effectively immobilizing the vehicle. For example, in a typical 6×4 vehicle, a rupture of any one of the four pneumatic lines to the wheel ends could result in parking brake release pressure being bled off from all four spring brake actuators. This has been the standard industry design practice, as a failure of a single brake actuator or the pressure delivery to a single axle has been viewed as a serious event warranting automatic full application of all of the vehicle's brakes as desirable "fail safe" outcome.

Notwithstanding the common industry design practice, there may also be situations in which full parking brake application and the resulting complete immobilization of the vehicle could have undesired consequences. For example, in a commercial application of a vehicle with multiple axles such as a logging truck, being forced to park or automatically immobilize the vehicle in the event of a parking brake release pressure failure at one wheel end may be highly undesirable when the vehicle is at a remote location (such as deep in a forest on a logging road), where repair facilities are far away and/or the immobilization of the vehicle may block a much-needed passage, such as a fire road in the case of a logging truck or the travel lanes of a high speed, high vehicle volume highway in the case of an over-the-road commercial vehicle.

Other examples where automatic application of all spring applied parking brakes in the event of a single wheel end failure may be undesirable include heavy police vehicles or military vehicles which may be subjected to combat conditions such as criminal attacks or exposure to improvised explosive devices ("IEDs"). During such an event, damage to a pneumatic line serving one wheel end in a prior art common-supply parking brake system could cause all of the wheel ends' parking brakes to be immediately applied, effectively immobilizing the vehicle in a location where the vehicle and its personnel would be vulnerable to further attacks.

It would be desirable to have a brake system which, in addition to permitting full parking brake release and application capability in normal operating conditions, also responds to a line failure at one wheel end in a manner which provides for continued reliable release and application of the parking brakes of the remaining undamaged wheel ends.

The present invention solves the above-described and other problems of the prior art by arranging devices at each wheel end which function as wheel end shut-off devices to isolate the damaged wheel end from the remaining portions of the service brake system and the parking brake system while not restricting flow during spring brake modulation.

The invention is not limited to damage affecting solely the lines between the flow control components and a parking brake actuator, but includes any damage at a wheel end which may result in the release of parking brake release pressure, such as damage to the parking brake release actuator portion of a wheel end's spring brake actuator.

Other objects, advantages and novel features of the present invention will become apparent from the following detailed description of the invention when considered in conjunction with the accompanying drawings.

DETAILED DESCRIPTION OF THE DRAWINGS

Figure 1:
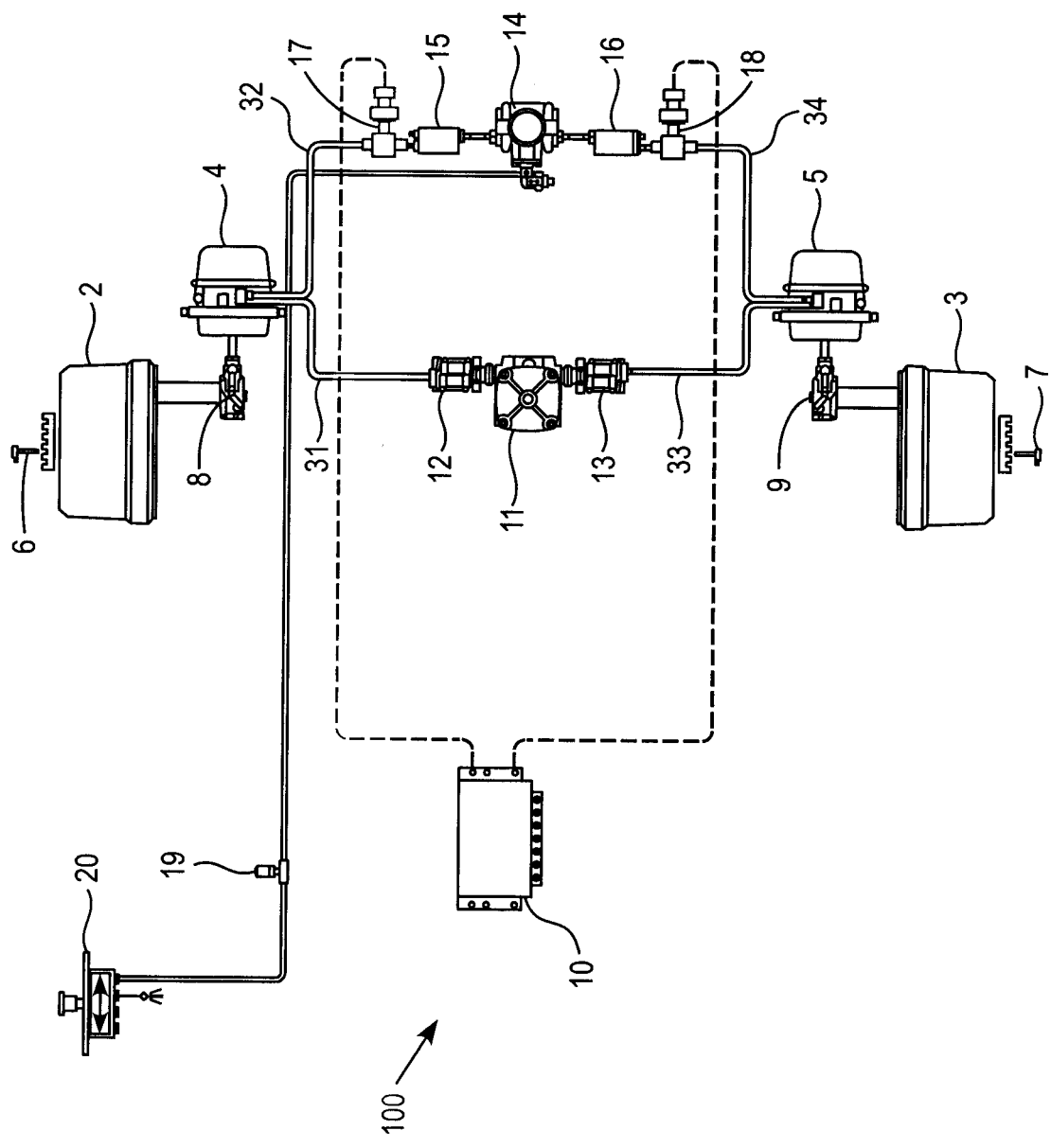
FIG. 1 is a schematic diagram of a portion of a system for isolating a service brake wheel end failure according to an exemplary embodiment of the present invention.

FIG. 1 is schematic diagram of a portion of a braking system for isolating a service brake wheel end failure according to an exemplary embodiment of the present invention in which an antilock braking system control unit determines the presence of a failed wheel end.

The partial system 100 illustrated in FIG. 1 includes a pair of foundation brakes 2 and 3, which are connected to spring brake actuators 4 and 5, respectively, for actuation of the foundation brakes. Only a partial system is illustrated to simplify the illustration and its corresponding description. The foundation brakes 2 and 3 may be S-cam brakes, air disc brakes or the like. Of course, the system could include many more foundation brakes, spring brake actuators, and the like.

The spring brake actuators 4 and 5 are composed of separate mechanical and fluid (e.g., air) actuators in one housing. The fluid applied portion of the actuator functions as the service brake, while the mechanical portion functions as the parking/emergency brake. The service actuator requires air pressure to apply the service brakes, while the parking/emergency actuator uses air pressure to release the brakes. The spring brake actuators 4 and 5 may be, for example, Bendix® Eversure® Spring Brakes available from Bendix Commercial Vehicle Systems LLC of Elyria, Ohio.

As shown in the drawing, each of the foundation brakes 2 and 3 may have a wheel speed sensor 6 and 7, respectively, which is located adjacent to the brake for monitoring wheel speed. The wheel speed sensors 6 and 7 may alternatively, or additionally, be other types of sensors for monitoring a variety of parameters, such as wheel speed, stroke, torque, wheel slip, temperature and the like. As part of the brake assembly, the foundation brakes 2 and 3 may be provided with automatic slack adjusters 8 and 9, which provide torque to rotate the brake camshaft when the brake pedal is depressed.

A central portion of the system 100 includes an antilock braking system control unit (ABS-ECU) 10 and a plurality of devices for monitoring and controlling the flow of air to/from the spring brake actuators, as further described below. The antilock braking system control unit 10 may be, for example, a Bendix® EC60™ controller available from Bendix Commercial Vehicle Systems LLC.

A service relay 11 is disposed between antilock braking modulators 12 and 13. The service relay 11 has a fluid (e.g., air) input (not shown) that provides fluid for the service side of the spring brake actuators 4 and 5 and outputs via supply lines 31 and 33 to the antilock braking modulators 12 and 13 for actuation of the spring brake actuators 4 and 5. The antilock braking modulators 12 and 13 may be, for example, Bendix® M-32™ antilock modulators available from Bendix Commercial Vehicle Systems LLC.

On the spring/parking side of the system between the spring brake actuators 4 and 5, a spring brake control valve 14 is disposed. The spring brake control valve 14 provides rapid application of the spring brake actuator 4/5 when parking and modulates application of the spring brake actuator 4/5 when a failure occurs in the service brake system. The spring brake control valve 14 may be, for example, a Bendix® SR-7® Spring Brake Modulating Valve available from Bendix Commercial Vehicle Systems LLC.

The spring brake control valve 14 has a fluid input (not shown) at the supply inlet port S. Outputs of the spring brake control valve 14 are provided to the spring brake actuators 4 and 5 via the differential protection valves 15 and 16, pressure indication devices, which may be pressure sensors or pressure switches, 17 and 18, and the supply lines 32 and 34 to control the supply of air to the spring brake actuators 4 and 5.

The antilock braking system control unit 10 monitors the pressure indication devices 17 and 18 to determine when a wheel end failure has occurred. The pressure in the supply lines 32 and 34, for example, may be monitored to determine when the supply line pressure has dropped below a threshold value that indicates a failure in the wheel end. In other words, when the normal parking brake line pressure has been lost, there is a failure at the wheel end.

When the pressure in a parking brake supply line 32/34 indicates a wheel end failure, the normally operating spring brake actuator 4/5 is isolated so that the failed wheel end does not negatively impact the whole braking system in a manner that immobilizes the vehicle or deactivates the functioning of the intact wheel ends. To isolate the intact system from the failed portion of the system, the antilock braking system control unit 10 closes the antilock braking modulator 12/13 at the failed wheel end only. Accordingly, the antilock braking system control unit 10 maintains control of the ABS for the intact portion of the braking system. That is, the wheel ends that do not have a failure are able to maintain proper functioning of the service braking system including the ABS. By contrast, the service brake at the failed wheel end is shut off.

Additionally, when a failure at a wheel end is determined, although the parking brake at the failed wheel end is enabled, the other parking brakes are protected and will not actuate automatically since the air is maintained in the parking release portion of the spring brake actuator, which prevents immobilization of the vehicle. In particular, when a differential protection valve 15/16 determines that pressure has been lost in a supply line 32/34, the differential protection valve 15/16 closes to prevent flow of fluid to the failed wheel end. Without the flow of fluid, the parking brake of the failed wheel end cannot be disabled, and thus remains enabled.

Figure 2:
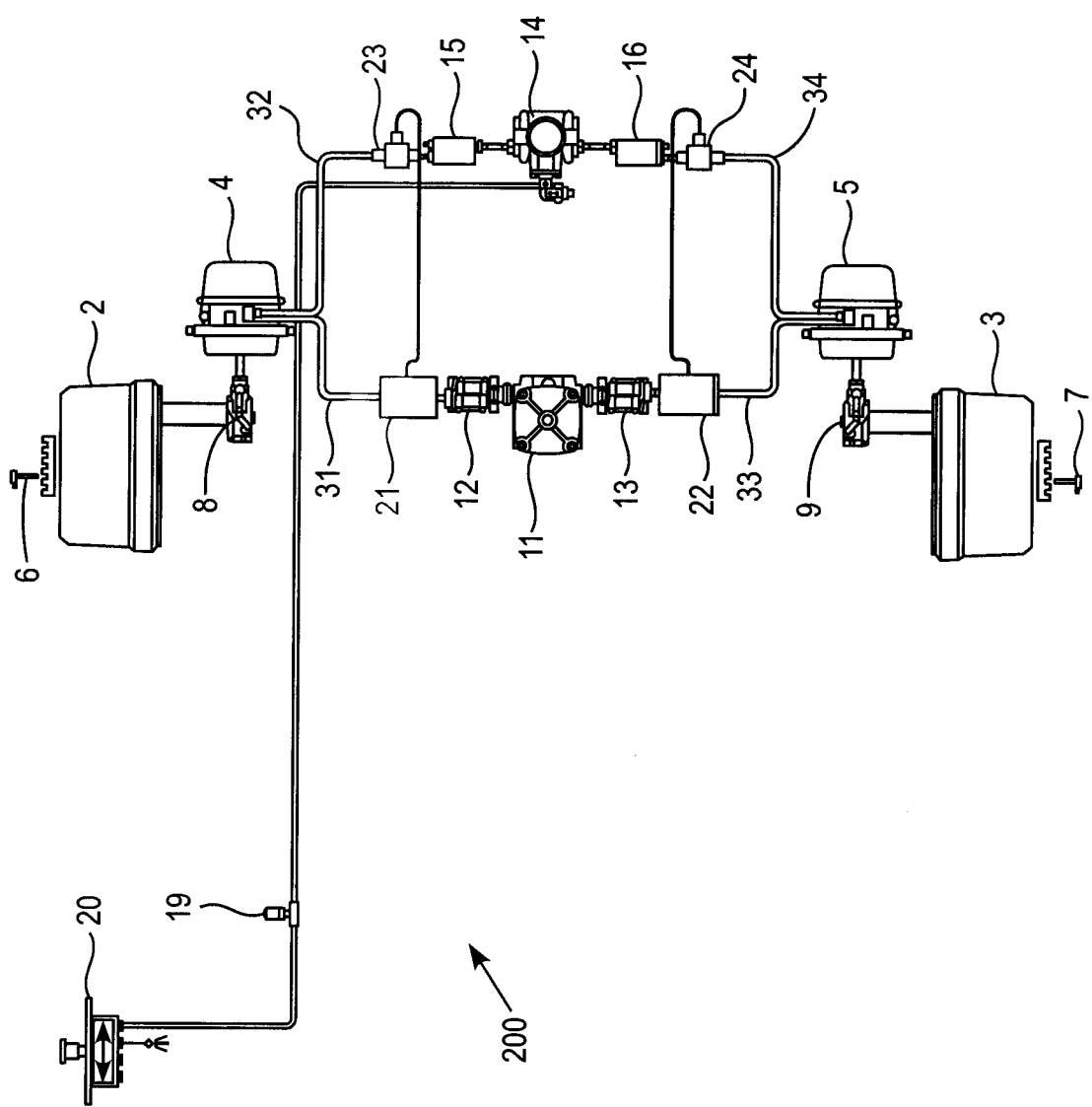
FIG. 2 is a schematic diagram of a portion of a system for isolating a service brake wheel end failure according to another exemplary embodiment of the present invention.

FIG. 2 is a schematic diagram of a portion of a system for isolating a service brake wheel end failure according to another exemplary embodiment of the present invention in which service brake isolation valves isolate a failed wheel end from the rest of the service braking system. Some of the elements of FIG. 2 are the same as those in FIG. 1. Accordingly, the description of those elements is not repeated here. Unlike partial system 100 of FIG. 1, partial system 200 illustrated in FIG. 2 does not have an antilock braking system control unit.

The embodiment illustrated in FIG. 2 provides a pneumatic isolation valve 21/22 for each of the wheel ends. The service brake isolation valves 21 and 22 are connected between the antilock braking modulator 12/13 and the spring brake actuator 4/5 for each of the wheel ends for determining an operation state of each of the wheel ends and controlling antilock braking of each of the wheel ends, individually, based upon the operation state.

In particular, pressure indication devices 23 and 24 determine when the supply lines 32 and 34 have a pressure below a threshold value which indicates a fault condition in the parking brake line pressure. The outputs of the pressure indication devices 23 and 24 are provided to the control port C of the service brake isolation valves 21 and 22, respectively. Accordingly, when the service brake isolation valve 21/22 receives a control input from the pressure indication device 23/24 indicating that the park line pressure is too low, the service brake isolation valve 21/22 shuts off, which isolates the failed wheel end.

Like the embodiment described above in relation to FIG. 1, the embodiment of FIG. 2 also provides for protecting the parking brakes at the wheel ends that do not have a failure, while the parking brake of a failed wheel end is enabled. Thus, the failed wheel end is isolated from the rest of the braking system.

The present invention's isolation capability may be omitted on individual wheel ends, for example, at wheel ends judged to not be vulnerable to parking brake release pressure disruption, or where costs are to be minimized by only providing isolation capability for a subset of a vehicle's wheel ends.

The foregoing disclosure has been set forth merely to illustrate the invention and is not intended to be limiting. For example, rather than providing flow control arrangement dedicated to a single wheel end, a single flow control arrangement may serve both wheel ends of an axle of the vehicle, such that in the event of damage to the lines of that axle, the service brakes and ABS of the remaining axle(s) may remain operational and the parking brake release actuators of the remaining axle(s) may be maintained in the released position so that the vehicle may be moved if the other axles can overcome the resistance of the wheels of the damaged axle. Because other such modifications of the disclosed embodiments incorporating the spirit and substance of the invention may occur to persons skilled in the art, the invention should be construed to include everything within the scope of the appended claims and equivalents thereof.

What is claimed is:

1. An apparatus for protecting an intact portion of a service brake system from a failed wheel end of a vehicle having at least two wheel ends, comprising:
    a spring brake actuator provided for each of the wheel ends for actuating a service brake and releasing a spring applied parking brake;
    a spring brake control valve for controlling actuation of the spring brake actuator for parking braking;
    a differential protection valve provided for each of the wheel ends for controlling a first supply of fluid to the spring brake actuator for releasing the spring applied parking brake;
    a relay valve for applying and releasing the service brake via the spring brake actuator;
    an antilock braking modulator provided for each of the wheel ends for controlling a second supply of fluid to the spring brake actuator for service braking; and
    an antilock braking system control unit for determining an operation state of each of the wheel ends and controlling the antilock braking modulators of each of the wheel ends, individually, based upon detection of a failed operation state;
    wherein, when the operation state of a first wheel end of the at least two wheel ends is a fault state, the differential protection valve protects an intact wheel end service brake by preventing the parking brake of each wheel end of the at least two wheel ends that is in a normal operation state from automatically applying.

2. The apparatus of claim 1, wherein the operation state of each of the wheel ends is determined based upon a pressure in a fluid supply line to the spring applied parking brake.

3. The apparatus of claim 1, wherein the fluid is a gas.

4. The apparatus of claim 1, wherein, when the operation state of a first wheel end of the at least two wheel ends is a fault state, the antilock braking system control unit closes the antilock braking modulator of the first wheel end, while keeping open the antilock braking modulator of wheel ends that are in a normal operation state.

5. The apparatus of claim 1, wherein the operation state of each of the wheel ends is determined based upon at least one of a pressure in a fluid supply line to the parking brake, an applied force at the spring brake actuator, a wheel speed, a temperature of a friction interface, and a wheel slip.

6. The apparatus of claim 1, wherein the antilock braking modulator protects intact wheel ends of the service brake system from a failed wheel end.

7. A method of protecting an intact portion of a service brake system from a failed wheel end of the service brake system of a vehicle, comprising the acts of:
    determining that one of a plurality of wheel ends of the service brake system has failed;
    protecting a parking brake at each of the plurality of wheel ends other than the failed wheel end such that the parking brakes do not actuate automatically;
    maintaining service brakes at each of the plurality of wheel ends other than the failed wheel end; and
    when an operation state of a first wheel end of the plurality of wheel ends is a fault state, protecting, by a differential protection valve, an intact wheel end service brake by preventing the parking brake of each wheel end of the plurality of wheel ends that is in a normal operation state from automatically applying.

8. The method of claim 7, wherein the acts of protecting the parking brakes and maintaining the service brakes comprise:
    preventing a supply of fluid to a spring brake actuator of the failed wheel end; and
    maintaining a supply of fluid to a spring brake actuator of each of the plurality of wheel ends other than the failed wheel end.

9. The method of claim 8, wherein the supply of fluid to the spring brake actuator of the failed wheel end is disabled by closing an antilock braking modulator valve.

10. The method of claim 7, wherein the determining act comprises determining an operation state of each of the wheel ends based upon a pressure in a fluid supply line to each of the parking brakes.

11. The method of claim 7, wherein antilock braking of the service brake system is maintained for all of the wheel ends other than the failed wheel end.

* * * * *